(12) United States Patent     (10) Patent No.:   US 12,697,713 B2

Tasaka            (45) Date of Patent:     Aug. 4, 2026

(54) ROBOT AND ROBOT SYSTEM

(71) Applicant: SEIKO EPSON CORPORATION, Tokyo (JP)

(72) Inventor: Hironori Tasaka, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/988,133

(22) Filed: Dec. 19, 2024

(65) Prior Publication Data

US 2025/0205874 A1     Jun. 26, 2025

(30) Foreign Application Priority Data

Dec. 20, 2023    (JP) ................................. 2023-215252

(51) Int. Cl.
*B25J 9/10*       (2006.01)
*F16H 19/08*     (2006.01)

(52) U.S. Cl.
CPC .............. *B25J 9/102* (2013.01); *F16H 19/08* (2013.01)

(58) Field of Classification Search
CPC ... B25J 9/102; B25J 18/04; F16H 1/28; F16H 1/46
See application file for complete search history.

(56) References Cited

U.S. PATENT DOCUMENTS

| | | | |
|---|---|---|---|
| 2018/0361521 A1* | 12/2018 | Takeda | B23Q 7/1405 |
| 2021/0053210 A1* | 2/2021 | Tamura | B25J 17/02 |
| 2022/0241960 A1* | 8/2022 | Hama | B25J 9/104 |

FOREIGN PATENT DOCUMENTS

JP      2009222116 A     10/2009

* cited by examiner

*Primary Examiner* — Randell J Krug
(74) *Attorney, Agent, or Firm* — The Sun IP Law

(57) ABSTRACT

A robot includes: a base; and a robot arm coupled to the base. The robot arm includes a plurality of arms having respective joints each of which has a power transmission mechanism. The power transmission mechanisms in the joints have a first reducer of an epicyclic gear type. The power transmission mechanism in one of the joints which is positioned on a farther side of the first reducer is lighter in weight than the first reducer.

6 Claims, 5 Drawing Sheets

FIG. 2

ROBOT AND ROBOT SYSTEM

CROSS-REFERENCE TO RELATED APPLICATIONS

The present application is based on, and claims priority from JP Application Serial Number 2023-215252, filed Dec. 20, 2023, the disclosure of which is hereby incorporated by reference herein in its entirety.

BACKGROUND OF THE INVENTION

1. Technical Field

The present disclosure relates to robots and robot systems.

2. Related Art

Some known robots have a robot arm that includes: a plurality of arms; and a plurality of joints via which adjacent arms are rotatably coupled to each other. Such robots are configured to drive the robot arm to a desired posture and then process workpieces. Each of the joints in the robot arm has, as a driver, a joint mechanism for rotatably driving a corresponding arm. This joint mechanism includes: a motor that serves as a drive source; and a reducer that decreases the rotational speed of the motor.

JP-A-2009-222116 discloses an example of a robot arm which includes an epicyclic gear type of reducer, as the reducer described above. This robot arm has a small back-lash between the gears and can be precisely positioned.

Unfortunately, such epicyclic gear type of reducers are relatively heavy in weight. If an epicyclic gear type of reducer is disposed at a distal end of a robot arm, for example, the inertial weight at this end may become heavy. In this case, to move the robot arm agilely, it is necessary to supply large amounts of electric currents to the motors in the respective joints. JP-A-2009-222116 fails to consider this disadvantage; thus, this configuration may have difficulty moving the robot arm agilely at low power consumption by controlling the amounts of electric current supplied to the motors.

SUMMARY OF THE INVENTION

According to a first aspect of the present disclosure, a robot includes: a base; and a robot arm coupled to the base, the robot arm including a plurality of arms, the arms having respective joints, the joints having respective power transmission mechanisms. The power transmission mechanisms in the joints have a first reducer of an epicyclic gear type. The power transmission mechanism in one of the joints which is positioned on a farther side of the first reducer is lighter in weight than the first reducer.

According to a second aspect of the present disclosure, a robot system includes: the robot according to the first aspect of the present disclosure; a rack in which the robot is installed; and a conveyor that sequentially transports a plurality of workpieces. The robot is configured to continuously process the plurality of workpieces being transported by the conveyor.

BRIEF DESCRIPTION OF DRAWINGS

FIG. 2 is a cross-sectional view of the first reducer mounted inside the robot illustrated in FIG. 1.

DETAILED DESCRIPTION OF THE INVENTION

A robot and a robot system of the present disclosure will be described below in detail, based on some embodiments illustrated in the accompanying drawings.

First Embodiment

Figure 1:
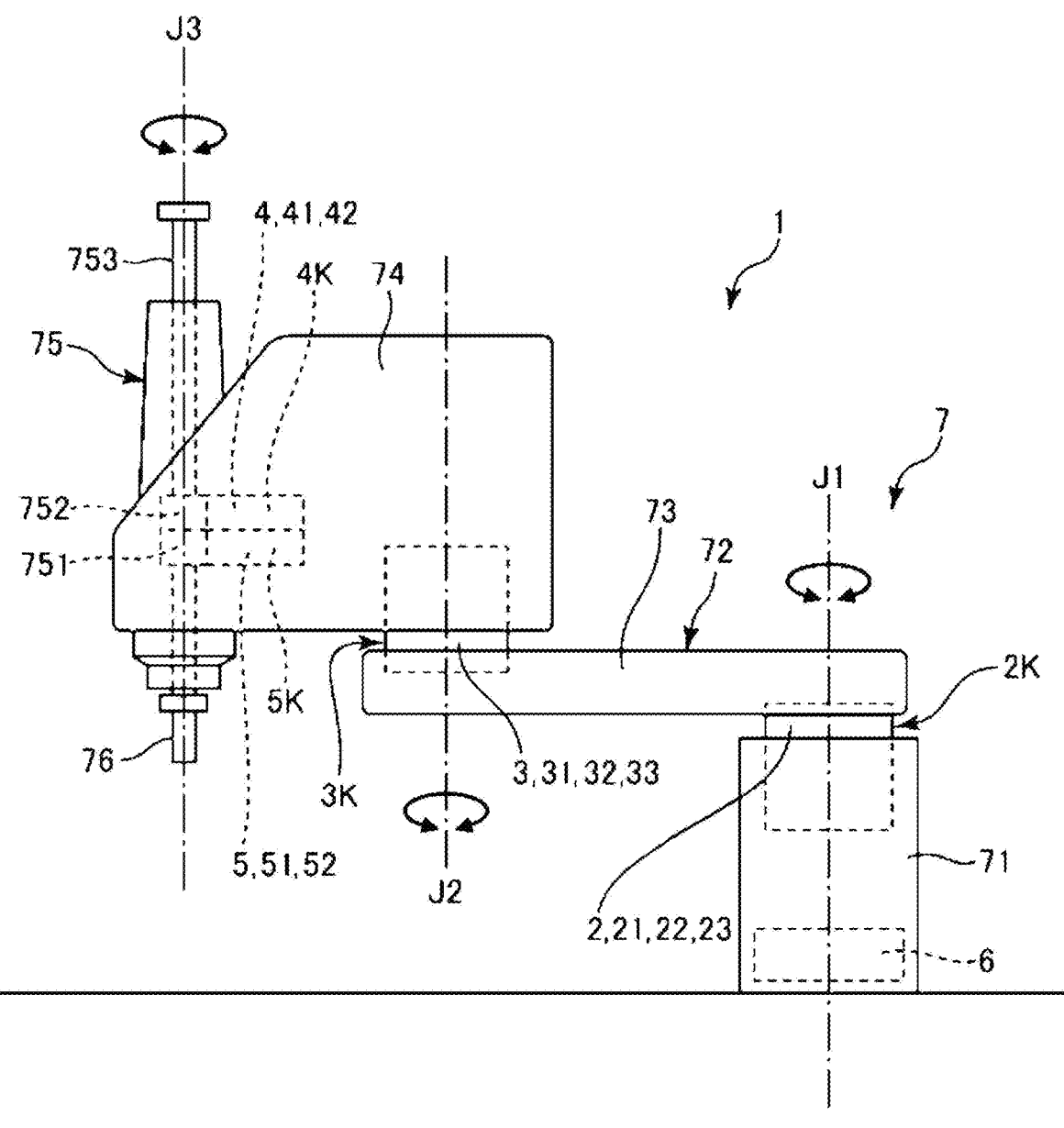
FIG. 1 is a schematic configuration diagram of a robot system according to a first embodiment of the present disclosure.
Figure 2:
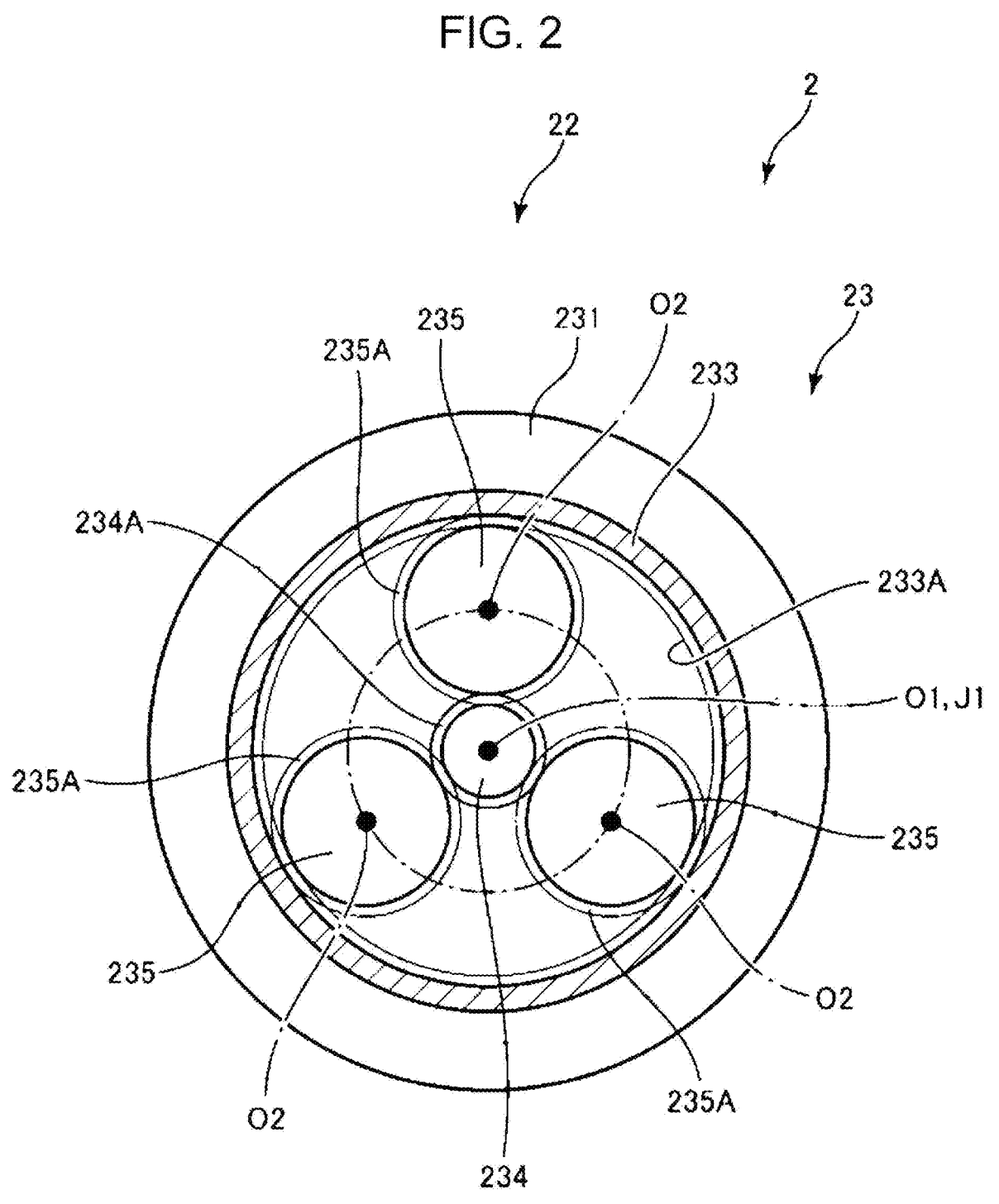
Figure 3:
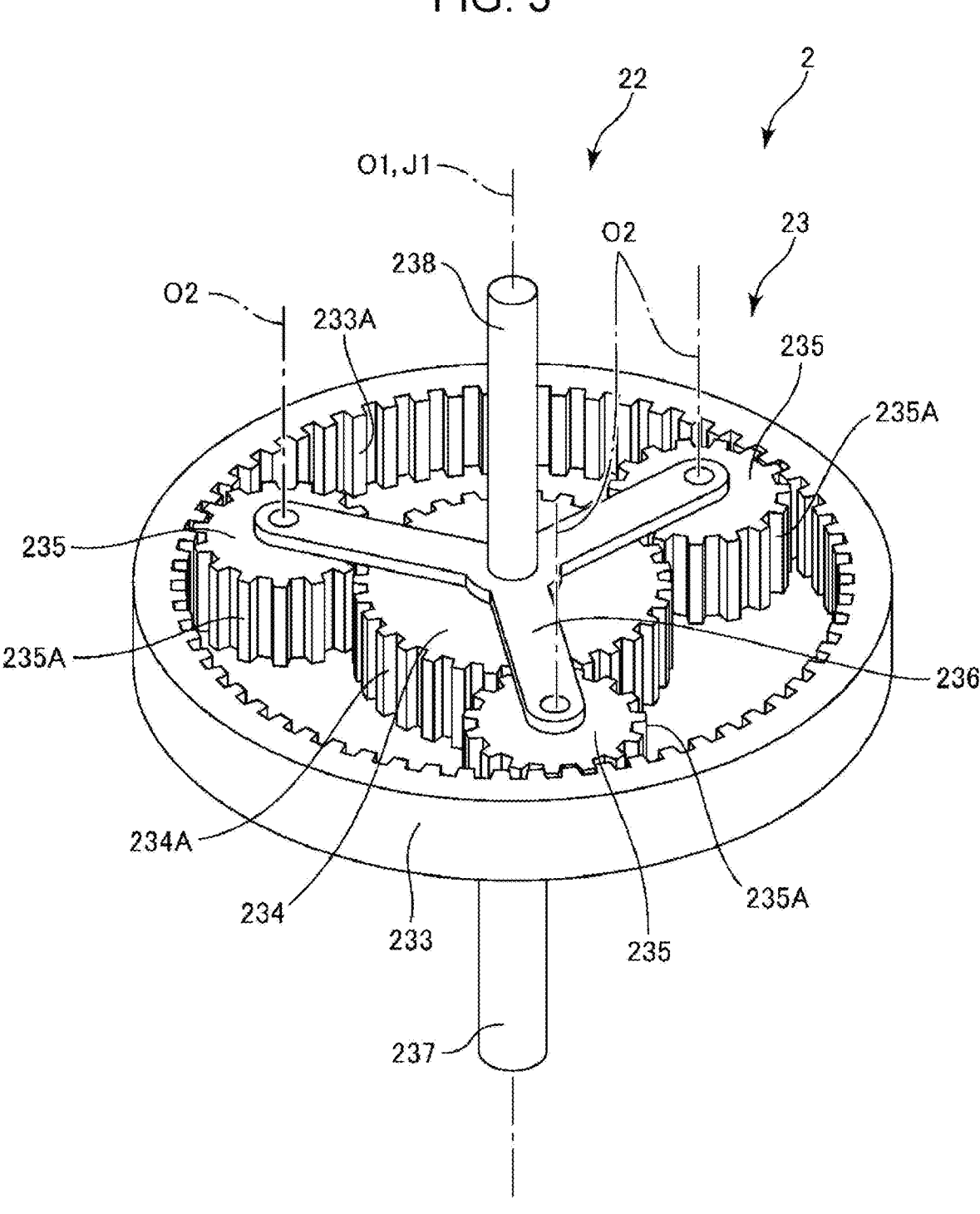
FIG. 3 is a perspective view of an internal structure of the first reducer illustrated in FIG. 2.

FIG. 1 is a schematic configuration diagram of a robot system according to a first embodiment of the present disclosure; FIG. 2 is a cross-sectional view of the first reducer mounted inside the robot illustrated in FIG. 1; and FIG. 3 is a perspective view of an internal structure of the first reducer illustrated in FIG. 2.

The upward or downward direction in FIG. 1 coincides with a vertical direction; the upper and lower sides in the vertical direction in FIG. 1 are also referred to, respectively, simply as upward and downward. Of each of a robot arm 72, a first arm 73, and a second arm 74, the right end in FIG. 1 is referred to as the proximal end, and the left end is referred to as the distal end.

The "vertical" described herein implies not only perfectly vertical but also slight inclination (e.g., within ±10 degrees) with respect to the vertical axis. The "parallel" described herein implies not only perfectly parallel but also slightly nonparallel (e.g., inclination within ±10 degrees).

A robot system 1 illustrated in FIG. 1 includes: a robot 7; and a controller 6 that controls individual sections constituting the robot 7.

The robot 7 in this embodiment may be a scalar robot to be used for holding, transporting, assembling, machining, coating, and inspecting, for example, of workpieces such as electronic components. Hereinafter, such operations will be collectively referred to as a process. However, there are no limitations on the usage of the robot 7 and the type of a process to be performed thereby. In addition, the robot 7 does not necessarily have to be a scalar robot; alternatively, the robot 7 may be a six-axis articulated robot, dual-arm robot, or other type of robot.

As illustrated in FIG. 1, the robot 7 includes: a base 71; and the robot arm 72 rotatably coupled to the base 71.

The base 71 is mounted on the floor of, for example, a process room in a factory. However, the base 71 may be mounted on any surface other than a floor; alternatively, the base 71 may be mounted on a wall surface, a ceiling, a rack 8 (see FIG. 5), or a movable carriage.

The controller 6 is mounted inside the base 71. However, the controller 6 is not limited to this configuration; alternatively, the controller 6 may be mounted at any location other than the base 71.

The robot arm 72 includes the first arm 73 and the second arm 74. The first arm 73 is coupled at its proximal end to the base 71 so as to be rotatable around a first rotation axis J1, which is a vertical line passing through the base 71. The second arm 74 is coupled at its proximal end to the distal end of the first arm 73 so as to be rotatable around a second rotation axis J2, which is a vertical line passing through the first arm 73.

The distal end of the second arm 74 is provided with a working head 75. The working head 75 includes a spline nut 751, a ball screw nut 752, and a spline shaft 753. The spline nut 751 and the ball screw nut 752 are disposed coaxially with each other at the distal end of the second arm 74. The spline shaft 753 passes through both the spline nut 751 and the ball screw nut 752. Furthermore, the spline shaft 753 is rotatable around a third rotation axis J3, which is a vertical line passing through the center of the second arm 74 and is also movable upward or downward along the third rotation axis J3.

The lower end of the spline shaft 753 is provided with an end effector 76. The end effector 76 is removably attached to the spline shaft 753. In this case, the end effector 76 may be selected as appropriate from among various tools, depending on a process to be performed.

The robot arm 72 further includes a first joint 2K, a second joint 3K, a third joint 4K, and a fourth joint 5K. The first joint 2K corresponds to the joint that comes first from the base 71; the second joint 3K corresponds to the joint that comes second from the base 71; the third joint 4K corresponds to the joint that comes third from the base 71; and the fourth joint 5K corresponds to the joint that comes fourth from the base 71.

Hereinafter, the joint that comes later than each of the first joint 2K, the second joint 3K, the third joint 4K, and the fourth joint 5K with respect to the base 71 is defined as the joint at the farther end of that joint. For example, the second joint 3K is positioned at the farther end of the first joint 2K; both the third joint 4K and the fourth joint 5K are positioned at the farther ends of the first joint 2K and the second joint 3K.

Alternatively, the third joint 4K may be regarded as the fourth joint, whereas the fourth joint 5K may be regarded as the third joint.

The first arm 73 is rotatably coupled to the base 71 via the first joint 2K, which has a motor unit 2 that can rotate the first arm 73 around the first rotation axis J1 relative to the base 71.

The second arm 74 is rotatably coupled to the first arm 73 via the second joint 3K, which has a motor unit 3 that can rotate the second arm 74 around the second rotation axis J2 relative to the first arm 73.

The spline shaft 753 is coupled to the second arm 74 via the third joint 4K so as to be vertically movable along the third rotation axis J3 relative to the second arm 74. The third joint 4K has a first drive mechanism 4 that rotates the ball screw nut 752, thereby moving the spline shaft 753 upward or downward along the third rotation axis J3.

The spline shaft 753 is also coupled to the second arm 74 via the fourth joint 5K so as to be rotatable around the third rotation axis J3 relative to the second arm 74. The fourth joint 5K has a second drive mechanism 5 that rotates the spline nut 751, thereby rotating the spline shaft 753 around the third rotation axis J3.

The motor unit 2 includes: a motor 21; and a power transmission mechanism 22 to be driven by the motor 21. The motor 21 generates drive force to rotate the first arm 73 relative to the base 71.

The motor unit 3 includes: a motor 31; and a power transmission mechanism 32 to be driven by the motor 31. The motor 31 generates drive force to rotate the second arm 74 relative to the first arm 73.

The first drive mechanism 4 includes: a motor 41; and a power transmission mechanism 42 to be driven by the motor 41. The motor 41 generates drive force to rotate the ball screw nut 752, thereby moving the spline shaft 753 upward or downward along the third rotation axis J3.

The second drive mechanism 5 includes: a motor 51; and a power transmission mechanism 52 to be driven by the motor 51. The motor 51 generates drive force to rotate the spline nut 751, thereby rotating the spline shaft 753 around the third rotation axis J3.

Each of the motors 21, 31, 41, and 51 may be a servo motor, such as an alternating current (AC) servo motor or a direct current (DC) servo motor, although there is no limitation on the type of motors 21, 31, 41, and 51.

Each of the motors 21, 31, 41, and 51 includes: a stator, a rotor, and a case (not illustrated). The rotor is rotatable inside the stator; the case accommodates both the stator and the rotor. The stator is mounted along the inner circumferential surface of the case and has some windings, such as three-phase windings. The stator generates a magnetic field in response to the conduction of electric currents, such as three-phase alternating currents (ACs), through the windings. In this case, the controller 6 controls the conduction pattern, the conduction timing, the conduction amount, and other conduction characteristics for the windings of the stator in each of the motors 21, 31, 41, and 51. As a result, each of the motors 21, 31, 41, and 51 can rotate at a desired timing, in a desired direction, and at a desired speed.

The power transmission mechanism 22 has a first reducer 23; the power transmission mechanism 32 has a second reducer 33; the power transmission mechanism 42 has a pulley and a belt (not illustrated); and the power transmission mechanism 52 has a pulley and a belt (not illustrated).

Each of the first reducer 23 and the second reducer 33 may be an epicyclic gear type of reducer. Hereinafter, only the configuration of the first reducer 23 will be described because the configuration of the second reducer 33 is substantially the same as that of the first reducer 23 except for their weights, details of which will be described later.

As illustrated in FIGS. 2 and 3, the first reducer 23 includes: a frame 231; an internal gear 233; a sun gear 234; a plurality of (three in this embodiment) epicyclic gears 235; a carrier 236; an input shaft 237; and an output shaft 238. It should be noted that the input shaft 237 and the output shaft 238 illustrated in FIG. 3 are thinner than the actual ones, for a better understanding of the internal structure. This is also true for FIG. 4. The first reducer 23 may further include an elastic support member on the outer side of the internal gear 233. Because of its stress effect, the elastic support member permits the internal gear 233 from being deformed in a radial direction thereof. In addition, the elastic support member may be strong enough to suppress the phase of the internal gear 233 from being shifted in the radial direction relative to the frame 231.

As illustrated in FIG. 2, the frame 231 is a cylindrical casing and protects the individual members mounted inside.

As illustrated in FIG. 3, the internal gear 233 has a ring or cylindrical shape centered at an axis O1 and is provided with a plurality of internal teeth 233A on its inner circumferential surface. The internal teeth 233A engage with a plurality of teeth 235A of each epicyclic gear 235.

The sun gear 234 has a plurality of teeth 234A on its outer circumferential surface and is disposed inside the internal gear 233 and coaxially with the internal gear 233. The sun gear 234 is coupled to the input shaft 237 so as to be rotatable around the axis O1. The input shaft 237 is coupled to the rotation shaft of the motor 21 via a bearing (not illustrated). The motor 21 is directly or indirectly fixed to the base 71, although not illustrated.

The three epicyclic gears 235 are disposed at equal angular intervals outside the sun gear 234 and inside the internal gear 233. Each epicyclic gear 235 has, on its outer circumferential surface, the teeth 235A that engage with the teeth 234A of the sun gear 234 and the internal teeth 233A of the internal gear 233. The three epicyclic gears 235 may have the same diameter and the same number of teeth 235A.

As illustrated in FIGS. 2 and 3, a gear train of the sun gear 234 and the three epicyclic gears 235 is disposed in a single row within the same plane, more specifically, within a predetermined cross section of the first reducer 23.

It should be noted that there are no limitations on the types, geometries, and other properties of the internal gear 233, the sun gear 234, and each epicyclic gear 235. For example, each of the internal gear 233, the sun gear 234, and the epicyclic gears 235 is a spur gear, as illustrated in FIG. 3. Alternatively, each of the internal gear 233, the sun gear 234, and the epicyclic gears 235 may be helical gears.

The epicyclic gears 235 are supported by the carrier 236 so as to be rotatable around corresponding axes O2, which are central axes of the epicyclic gears 235. The carrier 236 is a member having three bars that are arranged at 120-degree intervals and coupled together at their ends near the axis O1, as illustrated in FIG. 3. In this case, the carrier 236 is a star-shaped member. However, there is no limitation on the configuration of the carrier 236; alternatively, the carrier 236 may be a frame- or disc-shaped member.

The carrier 236 is coupled at its center to the output shaft 238, which is fixed to the proximal end of the first arm 73 via a bearing (not illustrated), for example.

When the motor 21 rotates, the rotational force thereof is transmitted to the sun gear 234 via the input shaft 237, so that the sun gear 234 rotates around the axis O1 in a predetermined direction. When the sun gear 234 rotates, each epicyclic gear 235 rotates around a corresponding axis O2 while revolving around the axis O1. When each epicyclic gear 235 revolves around the axis O1, the carrier 236 rotates around the axis O1, so that the output shaft 238 rotates around the axis O1. In this case, the rotational speed of the output shaft 238 is decreased by the epicyclic gears 235. As a result, the rotational speed of the output shaft 238 becomes lower than the rotational speed of the input shaft 237. In this way, the rotational speed of the input shaft 237 is decreased before transmitted to the output shaft 238. This configuration enables the first arm 73 to rotate relative to the base 71 at a decreased speed, thereby successfully increasing the rotational torque of the first arm 73.

It should be noted that there is no limitation on the rotational speed ratio of the input shaft 237 to the output shaft 238, namely, the reduction ratio of the first reducer 23. However, an example of the range of the reduction ratio will be described later.

Although not illustrated, the input shaft of the second reducer 33 is coupled to the motor 31 fixed to the proximal end of the second arm 74, whereas the output shaft of the second reducer 33 is fixed to the distal end of the first arm 73.

Alternatively, contrary to the above, the input shaft of the second reducer 33 may be coupled to the motor 31 fixed to the distal end of the first arm 73, whereas the output shaft of the second reducer 33 may be fixed to the proximal end of the second arm 74.

With the principle the same as that described above, the second arm 74 can rotate relative to the first arm 73.

The internal gear 233 has higher elasticity than the sun gear 234 and the epicyclic gears 235. In this case, however, it is sufficient for the internal gear 233 to have higher elasticity than the epicyclic gears 235. With this configuration, the backlash between the gears can be decreased, and the individual sections can be positioned with high precision during the operation of the robot arm 72.

The elasticity described herein refers to a feature of an object which depends not only on its material but also on its shape and other properties. More specifically, the elasticity refers to the feature of an object in which, when force is applied to the object, its shape is changed, and then when the force is released, the shape is returned to the original one. As an object has higher elasticity, the shape of the object is returned to the original one at a higher rate after the force applied to the object has been released. In short, the elasticity described herein is different from a property of an object which depends only on its material such as Young's modulus thereof.

Each of the frame 231, the internal gear 233, the sun gear 234, the epicyclic gears 235, the carrier 236, the input shaft 237, and the output shaft 238 may be made of a metal or hard resin.

As described above, a first reducer 23 includes: an internal gear 233 having a ring shape; a sun gear 234 disposed inside the internal gear 233 and coaxially with the internal gear 233; a plurality of epicyclic gears 235 each of which engages with both the internal gear 233 and the sun gear 234; and a carrier 236 that rotatably supports the epicyclic gears 235. The internal gear 233 has higher elasticity than the epicyclic gears 235. With this configuration, the backlash between the gears can be decreased, and individual sections constituting a robot arm 72 can be positioned with high precision.

The configuration of the first reducer 23 is, however, not limited to the above. Alternatively, the internal gear 233 may have substantially the same elasticity as the epicyclic gears 235 or may have a lower elasticity than the epicyclic gears 235.

In the first reducer 23, the gear train of the sun gears 234 and the plurality of epicyclic gears 235 may be disposed in a single row. By disposing gear trains in a minimal number of rows, the torque may be able to be transmitted by the first reducer 23 with a low loss. In this case, the first reducer 23 may be able to be made lightweight.

Each of the internal gear 233, the sun gear 234, and the epicyclic gears 235 may be a helical gear. When engaging with each other, helical gears is in contact with each other over a large area at low pressure, compared to spur gears. Thus, by using a helical gear as each of the internal gear 233, the sun gear 234, and the epicyclic gears 235, relatively high torque can be transmitted smoothly and effectively.

The configuration of the first reducer 23 is, however, not limited to the above; alternatively, each of the internal gear 233, the sun gear 234, and the epicyclic gears 235 may be a spur gear or other type of gear.

The first reducer 23 may have a reduction ratio V1 in the range from 1/100 to 1/3 or from 1/50 to 1/3.

The second reducer 33 may have a reduction ratio V2 in the range from 1/100 to 1/3 or from 1/50 to 1/3.

There is no limitation on the relationship between the reduction ratios V1 and V2. For example, V1≥V2 or 0.85V1≥V2 is acceptable.

The above reduction ratios V1 and V2 may be set by appropriately selecting the numbers of teeth 234A and teeth 235A.

Such epicyclic gear type of reducers (first reducer 23 and second reducer 33) provide lower grease viscous drag and lower torque loss than wave gear type of reducers in the case where their maximum outer diameters are the same as each other. Thus, when an epicyclic gear type of reducer and a wave gear type of reducer rotate at the same speed, the epicyclic gear type of reducer can operate more agilely at lower power consumption. However, when an epicyclic gear type of reducer and a wave gear type of reducer having the same maximum outer diameter are compared, the epicyclic gear type of reducer is typically heavier in weight. In this case, the moment of inertia of the robot arm 72 tends to be larger if the robot arm 72 includes epicyclic gear type of reducers.

As the moment of inertia of an object increases, the torque of this object may also increase, as is clear from equation (1) below, which expresses the equation of motion:

$$T = I \times \alpha, \tag{1}$$

where T denotes a torque, I denotes a moment of inertia, and $\alpha$ denotes an acceleration. Thus, when a robot arm 72 with an epicyclic gear type of reducer and a robot arm 72 with a wave gear type of reducer move at the same speed, the robot arm 72 with the epicyclic gear type of reducer may consume a larger amount of electrical power. However, when the moment of inertia of a robot arm 72 decreases while the robot arm 72 is generating a constant torque, the acceleration of the robot arm 72 increases so that the robot arm 72 can move more agilely.

In consideration of the above, when epicyclic gear type of reducers are mounted in a robot 7, it is necessary to decrease the moment of inertia of a robot arm 72 to achieve both low power consumption and agile motion of the robot 7. The related art has not considered or suggested this fact. The present disclosure, however, has successfully realized the fact by employing the configuration that will be described below.

In the following description, the weight of the power transmission mechanism 22 in the first joint 2K is denoted by G1; the weight of the power transmission mechanism 32 in the second joint 3K is denoted by G2; the weight of the power transmission mechanism 42 in the third joint 4K is denoted by G3; and the weight of the power transmission mechanism 52 in the fourth joint 5K is denoted by G4.

The weight G1 of the power transmission mechanism 22 can be regarded as being equal to the weight of the first reducer 23; the weight G2 of the power transmission mechanism 32 can be regarded as being equal to the weight of the second reducer 33; the weight G3 of the power transmission mechanism 42 can be regarded as being equal to the total weight of the belt and pulley therein; and the weight G4 of the power transmission mechanism 52 can be regarded as being equal to the total weight of the belt and pulley therein.

The robot 7 satisfies the relationship G1>G2>G3>G4. In short, the power transmission mechanisms 22 to 52 sequentially become lighter in weight from the base end toward the farther end of the robot arm 72. In this case, the power transmission mechanism 32 in the second joint 3K, the power transmission mechanism 42 in the third joint 4K, and the power transmission mechanism 52 in the fourth joint 5K, each of which is a joint at the farther end of the first reducer 23, are all lighter in weight than the first reducer 23. This configuration, even if an epicyclic gear type of reducer is used as the first reducer 23, can control the moment of inertia of the robot arm 72 during the operation of the robot 7. It is thereby possible to achieve both low power consumption and agile motion of the robot arm 72.

It should be noted that the configuration of the robot 7 is not limited to the above. Alternatively, the robot 7 may satisfy the relationship G1≥G2>G3>G4, the relationship G1>G2≥G3≥G4, the relationship G1>G2>G3≤G4, the relationship G1>G2≤G3>G4, or the relationship G1>G2≤G3≤G4. Alternatively, the robot 7 may satisfy the relationship G1>G2≥G3+G4, the relationship G1≥G2+G3, or the relationship G1≥G2+G4. Moreover, there is no limitation on the ratio G2/G1; however, an acceptable value thereof will be described later.

As described above, a robot 7 includes: a base 71; and a robot arm 72 coupled to the base 71. The robot arm 72 includes a plurality of arms, or a first arm 73 and a second arm 74, and a working head 75. These arms have respective joints, or a first joint 2K, a second joint 3K, a third joint 4K, and a fourth joint 5K. These joints have respective power transmission mechanisms 22, 32, 42, and 52. The power transmission mechanism 22 in the first joint 2K has a first reducer 23 of an epicyclic gear type. The power transmission mechanisms in the joints disposed at the farther end of the first reducer 23 are lightweight. More specifically, the power transmission mechanisms 32, 42, and 52 disposed, respectively, in the second joint 3K, the third joint 4K, and the fourth joint 5K, which are joints at the farther end of the first reducer 23, are lighter in weight than the first reducer 23. Using an epicyclic gear type of reducer as the first reducer 23 in this manner can provide a sufficient torque transmission performance and control the moment of inertia of the robot arm 72 during the operation of the robot 7. It is thereby possible to achieve both low power consumption and agile motion of the robot 7.

The first reducer 23 is limited to an epicyclic gear type of reducer; alternatively, the first reducer 23 may be an eccentric oscillation type, wave gear type, or other type of reducer.

Each of the power transmission mechanisms 42 and 52 may have a belt and a pulley. However, the configuration of each of the power transmission mechanisms 42 and 52 is not limited to a belt and a pulley; alternatively, each of the power transmission mechanisms 42 and 52 may have any other type of reducer in the present disclosure.

The robot 7 may satisfy the relationship G1>G2>G3+G4. This configuration may be able to further effectively control the moment of inertia of the robot arm 72 during the operation of the robot 7. It may be thereby possible to achieve both low power consumption and agile motion of the robot 7 at a higher level.

When the weight of the first reducer 23 is denoted by G1 and the weight of the second reducer 33 is denoted by G2, the ratio G2/G1 may be in the range from 0.3 to 0.9 or 0.4 to 0.8. This configuration may be able to achieve both low power consumption and agile motion of the robot 7 at a further higher level.

The robot arm 72 may include: the first arm 73; the second arm 74; and the spline shaft 753. The first arm 73 may be coupled to the base 71 via the first joint 2K, which is a joint coming first from the base 71, in such a way the first arm 73 can rotate around a first rotation axis J1. The second arm 74 may be coupled to the first arm 73 via the second joint 3K, which is a joint coming second from the base 71, in such a way that the second arm 74 can rotate around a second rotation axis J2, which is parallel to the first rotation axis J1. The spline shaft 753 may be coupled to the second arm 74 via the third joint 4K, which is a joint coming third from the base 71, in such a way that the spline shaft 753 can rotate around a third rotation axis J3, which is parallel to the first rotation axis J1. The power transmission mechanism 32 in the second joint 3K may have a second reducer 33 of an epicyclic gear type which is lighter in weight than the first reducer 23. The power transmission mechanism 42 in the third joint 4K may have the pulley and the belt. In this configuration, the farther end of the robot arm 72 may be lightweight, whereas the opposite end thereof, or the end on the side of the base 71, may be able to handle a high output torque. Consequently, it may be possible to decrease the moment of inertia of the robot arm 72 and improve the torque transmission performance in a balanced manner, thereby achieving both low power consumption and agile motion of the robot 7 at a further higher level.

The combination of the power transmission mechanisms 22, 32, 42, and 52, respectively, in the first joint 2K, the second joint 3K, the third joint 4K, and the fourth joint 5K may conform to pattern A1, A2, A3, or A4 that will be described below. Pattern A1 is the most suitable, pattern A2 is the second most suitable, pattern A3 is the third most suitable, and pattern A4 is the fourth most suitable.

Pattern A1

The first joint 2K has an epicyclic gear type of reducer; the second joint 3K has an epicyclic gear type of reducer; the third joint 4K has a pulley; and the fourth joint 5K has a pulley.

Pattern A2

The first joint 2K has an epicyclic gear type of reducer; the second joint 3K has an epicyclic gear type of reducer; the third joint 4K has a pulley; and the fourth joint 5K has a pulley and an epicyclic gear type of reducer.

Pattern A3

The first joint 2K has an epicyclic gear type of reducer; the second joint 3K has a wave gear type of reducer; the third joint 4K has a pulley; and the fourth joint 5K has a pulley.

Pattern A4

The first joint 2K has an epicyclic gear type of reducer; the second joint 3K has a wave gear type of reducer; the third joint 4K has a pulley; and the fourth joint 5K has a pulley and an epicyclic gear type of reducer.

If the robot 7 is a six-axis robot, the combination of the power transmission mechanisms 22, 32, 42, and 52, respectively, in the first joint 2K, the second joint 3K, the third joint 4K, and the fourth joint 5K may conform to pattern B1, B2, or B3 that will be described below. Pattern B1 is the most suitable, pattern B2 is the second most suitable, and pattern B3 is the third most suitable.

Pattern B1

The first joint has an epicyclic gear type of reducer; the second joint has an epicyclic gear type of reducer; the third joint has an epicyclic gear type of reducer; the fourth joint has a wave gear type of reducer; the fifth joint has a wave gear type of reducer; and the sixth joint has a wave gear type of reducer.

Pattern B2

The first joint has an epicyclic gear type of reducer; the second joint has a wave gear type of reducer; the third joint has a wave gear type of reducer; the fourth joint has a wave gear type of reducer; the fifth joint has a wave gear type of reducer; and the sixth joint has a wave gear type of reducer.

Pattern B3

The first joint has an epicyclic gear type of reducer; the second joint has an epicyclic gear type of reducer; the third joint has an epicyclic gear type of reducer; the fourth joint has an epicyclic gear type of reducer; the fifth joint has an epicyclic gear type of reducer; and the sixth joint has a wave gear type of reducer. However, it should be noted that each joint has the combination of a pulley and a belt.

Second Embodiment

Figure 4:
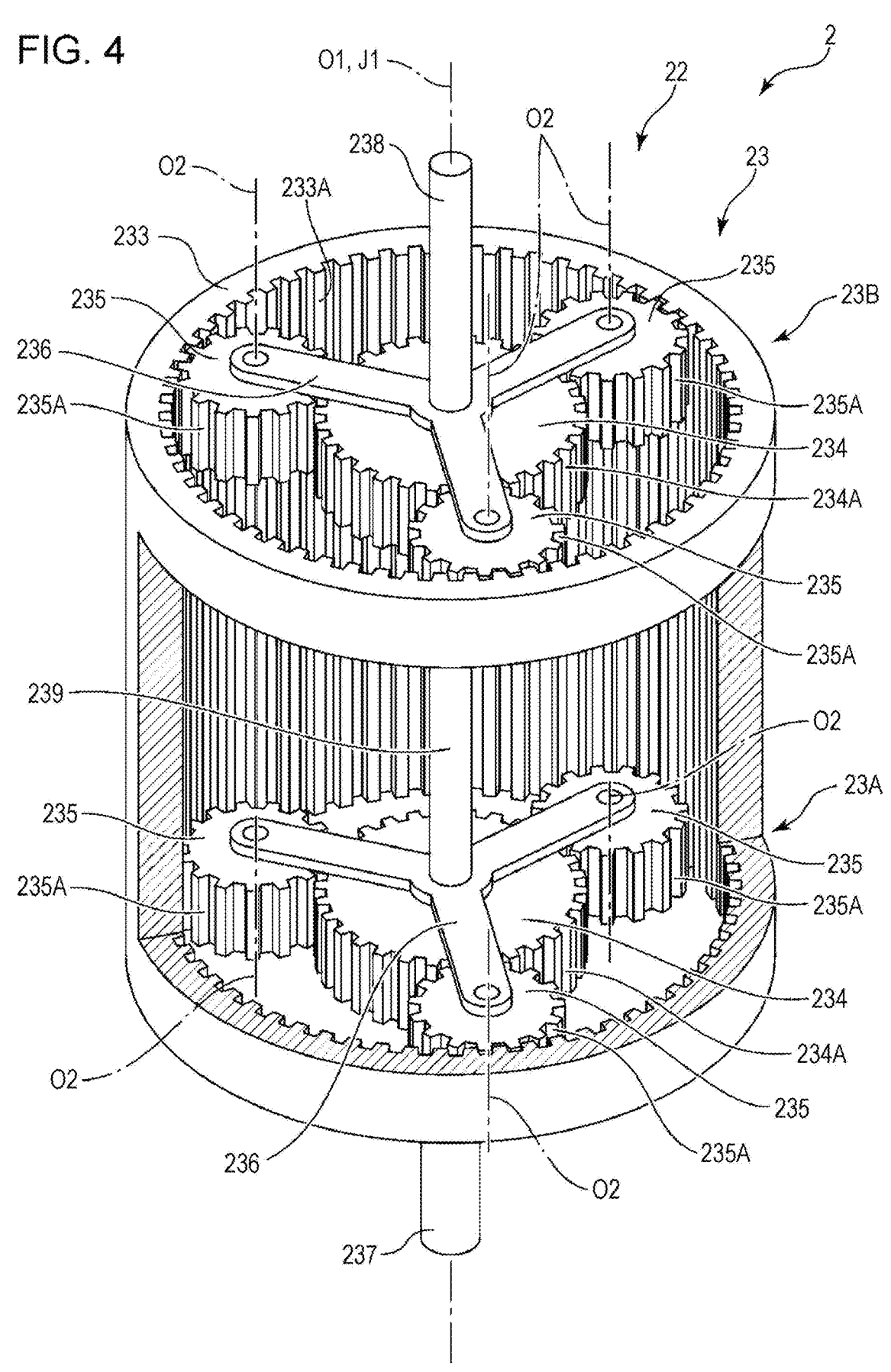
FIG. 4 is a perspective view of an internal structure of a first reducer mounted inside a robot in a robot system according to a second embodiment of the present disclosure.

FIG. 4 is a perspective view of an internal structure of a first reducer mounted inside a robot in a robot system according to a second embodiment of the present disclosure.

With reference to FIG. 4, a description will be given below of the robot in the robot system according to the second embodiment of the present disclosure. This description will focus on differences from the first embodiment and skip similar features. For a better understanding of the internal structure, the vertical scales of the individual components are illustrated in an exaggerated fashion in FIG. 4.

In a first reducer 23, gear trains of a plurality of sun gears 234 and a plurality of epicyclic gears 235 are disposed in two rows. More specifically, as illustrated in FIG. 4, a gear train 23A of a sun gear 234 and three epicyclic gears 235 is disposed within a first cross section of the first reducer 23, whereas a gear train 23B of a sun gear 234 and three epicyclic gears 235 is disposed within a second cross section of the first reducer 23. In this case, the first and second cross sections are shifted a predetermined distance from each other along an axis O1.

The gear trains 23A and 23B are arranged side by side along the axis O1. The lower side in FIG. 4 corresponds to the input side (input shaft 237 side), whereas the upper side in FIG. 4 corresponds to the output side (output shaft 238 side). The gear train 23A is disposed near the input side, whereas the gear train 23B is disposed near the output side.

Both the gear train 23A and the gear train 23B share a single internal gear 233. Furthermore, the gear train 23A has a carrier 236, which is coupled via a coupler 239 having a bar shape to the sun gear 234 in the gear train 23B. In this case, the coupler 239 serves as both the output shaft of the gear train 23A and the input shaft of the gear train 23B. Thus, the rotational speed of an input shaft 237 is decreased once by the gear train 23A and then by the gear train 23B. The configuration in the second embodiment can provide the first reducer 23 with a high reduction ratio V1, for example, which is 1.3 or more to 3.5 or less times as large as the reduction ratio V1 in the first embodiment.

In a first reducer 23, as described above, gear trains 23A and 23B each of which is formed by a sun gear 234 and a plurality of epicyclic gears 235 are disposed in a plurality of rows (two rows in this embodiment) along an axis O1, which is a central axis of an internal gear 233. This simple configuration can provide the first reducer 23 with a high reduction ratio V1, thereby stably outputting a relatively high torque. Moreover, the configuration permits the first reducer 23 to be made heavy in weight, for example, thereby helping to satisfy the relationship G1>G2.

Some conditions for the gear train 23A and the gear train 23B, such as the diameters and tooth thicknesses of the sun gears 234 and the epicyclic gears 235, the number of epicyclic gears 235, and the numbers of teeth 234A and teeth 235A may be either the same or different. Among those conditions, especially the reduction ratio V1 of the gear train 23A and the reduction ratio V2 of the gear train 23B may be either the same as or different from each other.

The second embodiment has been described regarding the case where gear trains are disposed in two rows along the axis O1. However, gear trains are not limited to this configuration; alternatively, gear trains may be disposed in three or more rows in the present disclosure.

Third Embodiment

Figure 5:
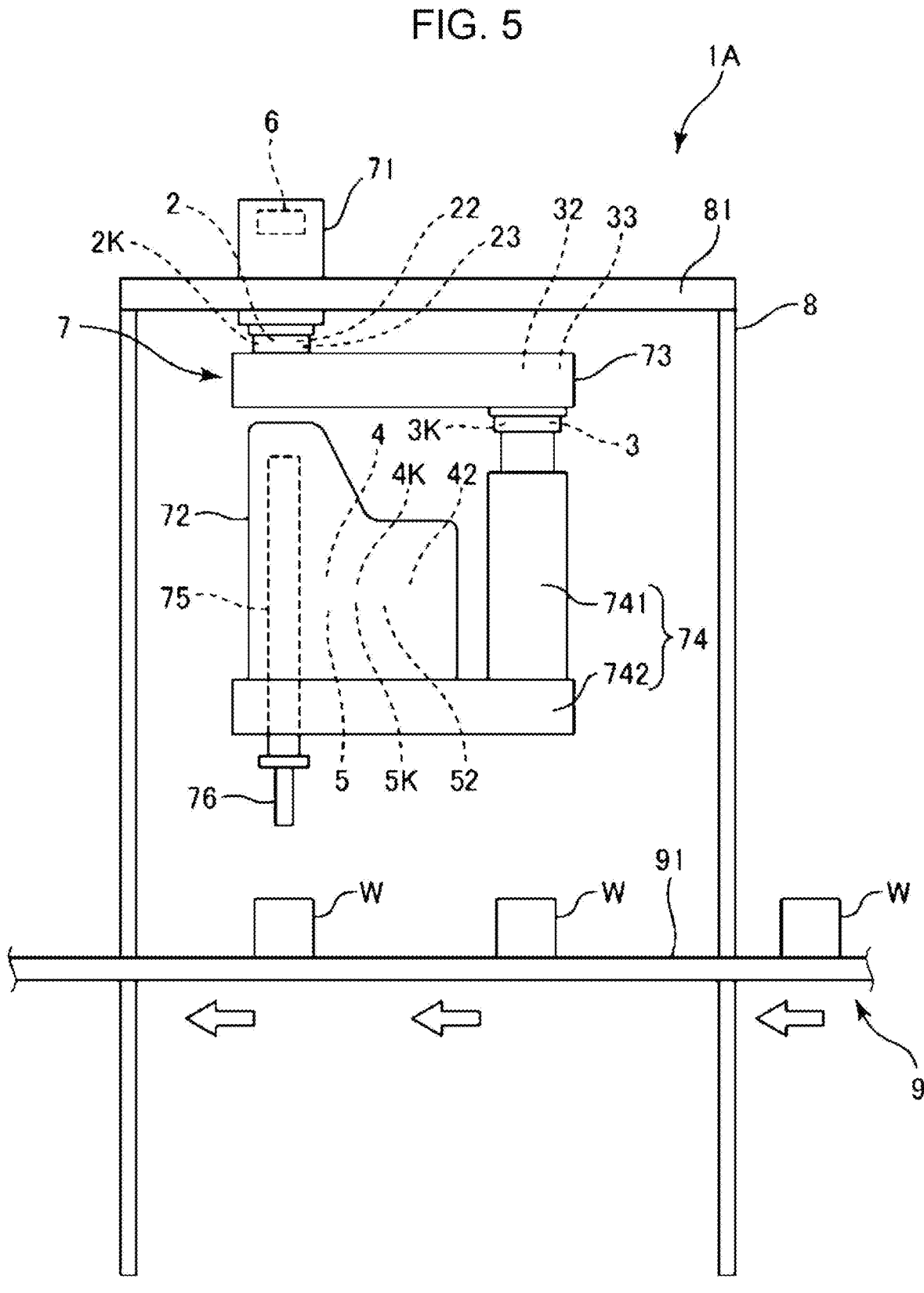
FIG. 5 is a schematic configuration diagram of a robot system according to a third embodiment of the present disclosure.

FIG. 5 is a schematic configuration diagram of a robot system according to a third embodiment of the present disclosure.

With reference to FIG. 5, a description will be given below of the robot in the robot system according to the third embodiment of the present disclosure. This description will focus on differences from the first embodiment or the second embodiment and skip similar features.

As illustrated in FIG. 5, a robot system 1A includes a robot 7, a controller 6, the rack 8, and a conveyor 9.

The robot 7 is a horizontally articulated robot suspended from the rack 8, namely, a ceiling-suspended scalar robot. Configurations of the robot 7 and the controller 6 are substantially the same as those in the foregoing first embodiment.

The robot 7 includes a first reducer 23 having substantially the same structure as that of either of the first reducers 23 in the first embodiment and the second embodiment. The controller 6 controls individual sections constituting the robot 7.

The rack 8 is formed into a frame shape with a top panel 81. The robot 7 further includes a base 71 fixed to the top panel 81. In this case, the orientation of the robot 7 is inverted with respect to that in the first embodiment.

The robot 7 further includes a robot arm 72 having a first arm 73 and a second arm 74. The second arm 74 includes: a first section 741 that is coupled to the first arm 73 and extends vertically; and a second section 742 that extends horizontally from the lower end of the first section 741. The second section 742 is provided with a working head 75, a first drive mechanism 4, a second drive mechanism 5, and some other components.

The conveyor 9 includes: a belt 91 that moves in the direction of the arrow in FIG. 5; and rollers (not illustrated) between which the belt 91 is hung. The rollers are coupled to a motor (not illustrated) and rotate to move the belt 91. In this case, a plurality of workpieces W are mounted on the upper surface of the belt 91.

The belt 91 moves in the direction of the arrow in FIG. 5, thereby sequentially transporting the workpieces W at predetermined intervals. The robot 7 continuously performs a predetermined process on the sequentially transported workpieces W from the position above the belt 91.

The moving timing and speed and other properties of the belt 91 may be controlled by the controller 6 or any other controller (not illustrated).

In the third embodiment, the first reducer 23 is an epicyclic gear type of reducer, as in the first and second embodiments. The first reducer 23 is thus heavier in weight than power transmission mechanisms 32, 42, and 52, respectively, in a second joint 3K, a third joint 4K, and a fourth joint 5K, all of which are positioned at the farther end of the first reducer 23. This configuration, even if the first reducer 23 is an epicyclic gear type of reducer, can control the moment of inertia of the robot arm 72 during the operation of the robot 7. It is thereby possible to achieve both low power consumption and agile motion of the robot arm 72. This agile motion of the robot arm 72 enables an efficient process, thereby contributing to improved productivity.

Epicyclic gear type of reducers, such as those mounted in the first reducer 23, are less prone to vibration than other types of reducers. This configuration thus can provide the robot system 1A with a sufficient vibration damping performance without using stiff, structurally complicated, heavy, or high-cost components for the rack 8. Consequently, it is possible to provide a low-cost, compact, and vibration-free robot system 1A.

As described above, a robot system 1A includes: a robot 7; a rack 8 in which the robot 7 is installed; and a conveyor 9 that sequentially transports a plurality of workpieces W.

The robot 7 is configured to continuously process the plurality of workpieces W being transported by the conveyor 9. The robot 7 in the robot system 1A configured above, which includes an epicyclic gear type of reducer as a first reducer 23, can provide a sufficient torque transmission performance and control the moment of inertia of the robot arm 72 during the operation of the robot 7. This configuration can achieve both low power consumption and agile motion of the robot arm 72. Consequently, it is possible to provide a low-cost, efficient, and vibration-free robot system 1A, thereby contributing to improved productivity.

It should be noted that the application of the robot system 1 in the first embodiment is not limited to that in the third embodiment in which a plurality of workpieces are to be sequentially processed. For example, the robot system 1 is used together with a transport apparatus that transports a workpiece in a single batch so that the robot system 1 can process a plurality of workpieces one by one.

The robot and the robot system in the present disclosure have been described based on the first to third embodiments illustrated in the accompanying drawings. However, the present disclosure is not limited to such embodiments. More specifically, the components of individual sections constituting each of the robot and the robot system may be replaced with other components having equivalent functions. Furthermore, each of the robot and the robot system may include some additional components.

The invention claimed is:

1. A robot comprising:

a base; and a robot arm coupled to the base, the robot arm including
    a plurality of arms, each of the plurality of arms having
        respective joints, each of the joints having a power
        transmission mechanism, wherein the power transmission mechanism in a first joint of the
    joints has a first reducer of an epicyclic gear type, and the power transmission mechanism in a second joint of
    the joints which is positioned on a farther side of the
    first reducer is lighter in weight than the first reducer,
    wherein the first reducer includes an internal gear having a ring shape, a sun gear disposed inside the internal gear and coaxially
    with the internal gear, a plurality of epicyclic gears engaging with both the
    internal gear and the sun gear, and a carrier rotatably supporting each of the epicyclic gears, the internal gear having higher elasticity than the epicy-
    clic gears.

2. The robot according to claim 1, wherein a gear train of the sun gear and the plurality of epicyclic
    gears is disposed in a single row.

3. The robot according to claim 1, wherein gear trains of the sun gear and the plurality of epicyclic
    gears are disposed in a plurality of rows and arranged
    along a central axis of the internal gear.

4. A robot system comprising:

the robot according to claim 1;

a rack in which the robot is installed; and a conveyor that sequentially transports a plurality of
    workpieces, the robot being configured to continuously process the
    plurality of workpieces being transported by the con-
    veyor.

5. The robot according to claim 1, wherein
the robot arm includes
    a first arm coupled to the base via the first joint so as
      to be rotatable around a first rotation axis, the first
      joint being one of the joints which comes first from
      the base,
    a second arm coupled to the first arm via the second
      joint so as to be rotatable around a second rotation
      axis, the second joint being one of the joints which
      comes second from the base, the second rotation axis
      being parallel to the first rotation axis, and
    a shaft that moves along a third rotation axis via a third
      joint relative to the second arm, the third joint being
      one of the joints that comes third from the base, the
      third rotation axis being parallel to the first rotation
      axis, wherein
the power transmission mechanism in the second joint has
    a second reducer of an epicyclic gear type, the second
    reducer being lighter in weight than the first reducer,
    and
the power transmission mechanism in the third joint has
    a pulley and a belt.

6. The robot according to claim 5, wherein
a ratio $G_2/G_1$ is in a range from 0.3 to 0.9,
where $G_1$ denotes a weight of the first reducer, and $G_2$
    denotes a weight of the second reducer.

*   *   *   *   *